United States Patent [19]

Airhart et al.

[11] 4,284,165

[45] Aug. 18, 1981

[54] ACOUSTIC PULSE GENERATOR

[75] Inventors: Tom P. Airhart, Plano; Henry R. Barta, Dallas, both of Tex.

[73] Assignee: Atlantic Richfield Company, Los Angeles, Calif.

[21] Appl. No.: 108,106

[22] Filed: Dec. 28, 1979

[51] Int. Cl.³ .................... G01V 1/133; G01V 1/147
[52] U.S. Cl. ............................. 181/119; 181/117; 367/144
[58] Field of Search ............ 181/117, 118, 119, 120; 367/144, 146

[56] References Cited

U.S. PATENT DOCUMENTS

| | | | |
|---|---|---|---|
| 3,288,244 | 11/1966 | Kirby | 181/119 |
| 3,653,460 | 4/1972 | Chelminski | 181/120 |
| 3,981,379 | 9/1976 | Sayous | 181/117 |
| 4,098,369 | 7/1978 | Alschuler | 181/120 |
| 4,147,228 | 4/1979 | Bouyoucos | 181/119 |

Primary Examiner—Howard A. Birmiel
Attorney, Agent, or Firm—Robert M. Betz

[57] ABSTRACT

Apparatus for generating an acoustic pulse in a medium including an upstanding cylindrical housing within which an impact piston retained in the upper end of housing by an electrically controlled latch is driven downwardly by compressed gas to strike a target plate positioned adjacent the bottom of the housing. The compressed gas is provided by high volume accumulators interconnected with large area ports penetrating the sidewall of the housing near its top. The tapered upper portion of the piston presses against static seals mounted on the correspondingly tapered housing bore above and below these ports. This taper enables the compressed air to exert a positive break away force on the piston. Quick release of the latch triggers the downward thrust of the piston to deliver a blow against the target plate.

7 Claims, 1 Drawing Figure

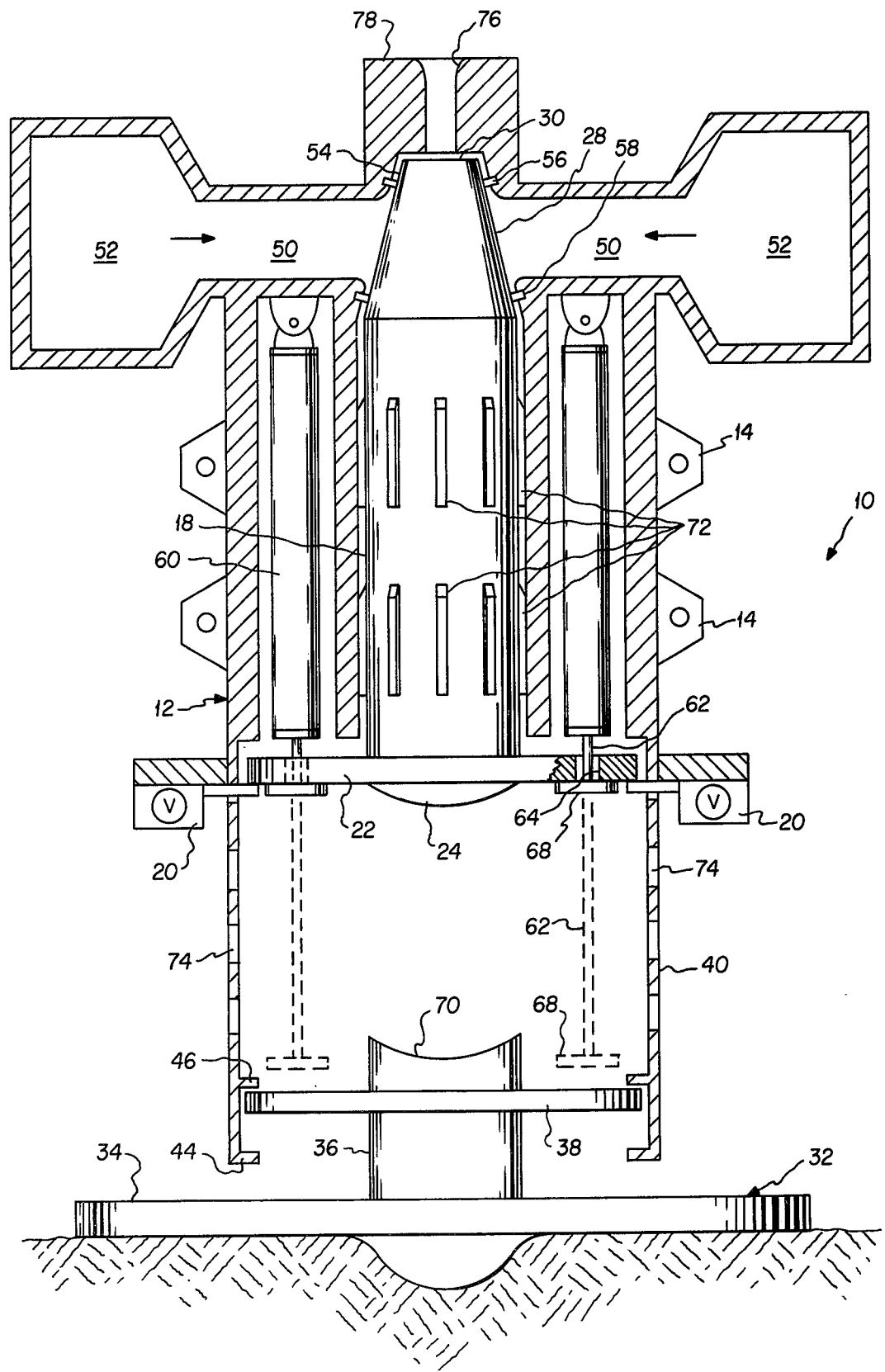

ACOUSTIC PULSE GENERATOR

BACKGROUND OF THE INVENTION

1. Field of the Invention

This invention relates generally to the field of seismic prospecting, and more particularly, to a method and apparatus for injecting an acoustic pulse.

2. Description of the Prior Art

In Applicant's co-pending, commonly assigned applications, Ser. No. 3,107,009 filed Dec. 21, 1979 entitled Acoustic Pulse Generator, truck-mounted apparatus is described wherein gas pressure may be employed to propel an impact piston downwardly against a target plate located adjacent the lower end of the housing. The compressed gas is provided by one or more accumulators and introduced through large area ports in the sidewall of the housing which are normally blocked by the wall of the piston in its upper firing position. Initial downward displacement of the piston in opposition to spring bias clears the ports and exposes the face of the piston to the gas pressure, thus driving the piston downward to deliver a blow to the target.

The invention to be described hereafter represents an improvement on the method and apparatus of the above prior application which is particularly concerned with means for more efficiently exploiting compressed gas as a driving force in an impact device of this character.

It is therefore a general object of the present invention to provide an acoustic pulse generator of the type described with improved mass acceleration means.

It is a more particular object of the present invention to provide improved means for applying pressurized gas as an energy source in an acoustic pulse generator of the type described.

Other and further objects and advantages of the invention will become apparent from a consideration of the detailed description and drawings to follow.

SUMMARY OF THE INVENTION

In accordance with the preferred embodiment of this invention a hollow cylindrical housing adapted to be supported above the ground in a substantially upright position slidably engages an elongated impact piston normally retained adjacent the closed upper end of the housing by means of an electrically controlled latch. The sidewall of the housing adjacent the upper end is slightly tapered and provided with large area ports interconnected with a source of compressed gas. These ports are initially blocked by a correspondingly tapered upper portion of the piston. Static seals mounted on the inner bore of the housing above and below these ports bear against the tapered portion of the piston. A component of force applied by the compressed gas is constantly exerted downwardly against the tapered piston wall to ensure positive breakaway from these seals. Quick release of the latch allows the piston to fall freely and suddenly applies the full force of the compressed gas to drive the piston so as to deliver a blow to a target plate positionable on the ground adjacent the lower end of the housing. At the same time the gas is vented upwardly through one or more vents in the upper end of the housing to compensate for any recoil forces on the housing itself. Lift cylinders are provided for returning the impact cylinder to its firing position.

BRIEF DESCRIPTION OF THE DRAWINGS

The drawing is an elevational view of an apparatus in accordance with the preferred embodiment of this invention prior to firing.

DESCRIPTION OF THE PREFERRED EMBODIMENTS

With reference now to the drawing, there is illustrated an acoustic pulse generating apparatus 10 in accordance with the preferred embodiment of this invention. A hollow cylindrical housing 12 is adapted to be supported in an upright position. This may be accomplished, for example, by attachment of brackets 14 to the handling device of a transporting vehicle (not shown). An impact piston 18 is normally retained securely adjacent the upper end of the housing 12 by means of quick release electrically controlled latches 20. The lower end of the piston is provided with an enlarged diameter plate 22 having a convex central portion 24. The upper end of the piston 18 is provided with an upwardly tapered wall 28 terminating in upper face 30. Adjacent the lower end of the housing 12 a target plate 32 is positionable on the surface of the earth or other medium in axial alignment with impact piston 18 and in spaced relation thereto. The target plate 32 consists generally of the bottom plate 34 and an upstanding central pillar 36 from which a flange 38 extends radially to a point adjacent the lower sidewall 40 of the housing 12. The lower end of sidewall 40 is provided with inwardly extending ribs 44 and 46. Rib 44 extends radially beneath flange 38 to enable pick up of target plate 32 for transport or deployment from one position to another. Rib 46, in like manner, blocks undesired upward travel of target 32 relative to housing 12.

The sidewall of the housing 12 adjacent the upper end is penetrated by multiple large area ports 50 which are interconnected with high volume accumulators 52. As shown in the drawing, the tapered wall 28 of piston 18 blocks the entrance to ports 50 from within the housing 18. Mounted on the correspondingly tapered upper bore 54 of housing 18 above and below ports 50 respectively are static seals 56 and 58. Seals 56 and 58 bear against tapered wall 28 of piston 18, thereby preventing gas pressure from escaping upwardly or downwardly within the bore of housing 12. It is a feature of this invention that because of the taper of piston wall 28 a component of force due to the compressed gas is constantly exerted downwardly against piston 18. This taper may be, for example, at an angle of about 5° to the axial direction, which is sufficient to provide an intial breakaway force on piston 18 in the event it tends to wedge against seals 56 and 58. The taper is not so great, however, that the downward pressure on latches 20 becomes excessive so as to risk leakage around seals 56 and 58.

On either side of the piston 18 there are positioned hydraulic lift cylinders 60 with lift rods 62 extending through apertures 64 in piston impact plate 22. Lower end of lift rod 62 are provided with lift rings 68. Preparatory to the operation of generator 10, lift rods 62 are lowered to assume the dotted position as shown. Upon completion of the firing operation lift rings 68 are effective to engage plate 22 and return piston 18 to its intial ready position.

In operation, latches 20 are electrically operated and withdrawn so that impact piston 18 is free to fall downward away from seal rings 56 and 58. This enables the continuously present gas pressure, to enter the bore 54 and drive piston 18 downwardly, the driving force reaching a maximum at the moment the piston surface 28 is separated from upper seal ring 56. This may occur with a net downward movement of a fraction of an inch. Piston 18 is then driven with high velocity so that convex impacting surface 24 delivers a blow to mating concave upper surface 70 of pillar 36 to generate the desired acoustic pulse. During the downward motion of piston 18, it is maintained in proper axial position by means of guide strips 72 affixed to and extending longitudinally along the surface of piston 18. The upper end of guide strip 72 are beveled to ensure proper mating with the bore of housing 12 on return of piston 18 to its upper position. Lower housing wall 40 is provided with suitable air vents 74 to ensure no air pressure build up occurs beneath the piston 18 to lessen the effective kinetic energy.

Simultaneously, with the downward motion of piston 18 compressed gas is expelled through flared pressure vent 76 in the top 78 of housing 12. By the principle of action and reaction this compensates for any upward upward recoil force that may be exerted against housing 12 during the operation of the device.

It is understood that the preceding description and the accompanying drawing are illustrative only of a preferred embodiment of this invention. Therefore, without departing from the scope of this invention as set forth in the appended claims those skilled in the art will be able to make many modifications in the configuration and relative position of parts of the apparatus as described and shown.

What is claimed is:

1. An acoustic pulse generator ccomprising:
    (a) a hollow cylindrical housing having a closed top and open bottom and adapted to be supported in an upright position, the sidewall of said housing adjacent said closed top being penetrated by a one or more ports,
    (b) means for interconnecting said ports with a source of compressed gas,
    (c) an impact piston slidably interfitted within the bore of said housing, the wall of said piston having an upwardly and inwardly tapered portion end,
    (d) means for supporting said piston in a ready position so that said ports are covered by said tapered portion of said piston,
    (e) means mounted on the wall of said bore adpated to be sealingly engaged by the tapered portion of said piston in said ready position to prevent said compressed gas from entering said bore,
    (f) means for removing said support means, whereby said piston is driven downwardly and adapted to strike a target positioned adjacent the lower end of said housing.

2. Apparatus as claimed in claim 1 wherein said tapered portion of said piston extends upwardly and inwardly to the upper face thereof, the bore of said housing being tapered in corresponding fashion.

3. Apparatus as in claim 1 wherein any downward displacement of said piston causes disengagement between said seal means and said tapered wall of said piston, thereby admitting said compressed gas above said piston.

4. Apparatus as in claim 1 wherein the lower end of said impact piston terminates in an enlarged diameter plate, and wherein said support means comprises one or more electrically controlled latches extending radially inward beneath said plate.

5. Apparatus as in claim 4 including a plurality of hydraulic lift cylinders axially aligned with said impact piston, the impact plate of said impact piston being provided with apertures adapted to receive the lift rods of said lift cylinders, said lift rods being extendable to permit downward travel of said impact plate and being provided with means for lifting said impact plate from beneath.

6. Apparatus as in claim 1 including vent means in the closed upper end of said housing above said piston adapted to expell compressed air in compensation of upward recoil forces on said housing.

7. Apparatus for generating an acoustic pulse medium comprising:
    (a) a hollow cylindrical housing having a closed top and open bottom adapted to be supported in an upstanding position, the upper portion the bore of said housing being tapered in the direction of said closed top, said tapered portion being penetrated by a plurality of large area ports communicating with the exterior of said housing,
    (b) means connecting said ports with a source of compressed gas,
    (c) an impact piston movable within said housing and having a tapered upper portion adapted to mate with said tapered portion of said bore in the ready position of said piston and thereby to cover the entrance to said ports, a component of force of said compressed gas being thereby exerted continuously in a downward direction on said tapered portion of said piston.
    (d) means for supporting said piston in said ready position,
    (e) means mounted on the wall of said bore adapted to be sealingly engaged by the tapered portion of said piston in said ready position to prevent said compressed gas from entering said bore,
    (f) a target positionable adjacent the lower end of said housing, and
    (g) means for quickly removing said support means whereby said compressed gas is enabled to drive said piston downwardly to deliver a blow to said target.

* * * * *